United States Patent
Dagan et al.

(10) Patent No.: US 7,720,385 B2
(45) Date of Patent: May 18, 2010

(54) DEVICE AND METHOD FOR PROVISION OF CUSTOMIZED SYSTEM FOR OPTICAL TRANSMISSION OF DATA

(75) Inventors: Alon Dagan, San Diego, CA (US); Fred Sather, San Diego, CA (US); Allon Caidar, San Diego, CA (US)

(73) Assignee: Emcore Corporation, Albuquerque, NM (US)

( * ) Notice: Subject to any disclaimer, the term of this patent is extended or adjusted under 35 U.S.C. 154(b) by 597 days.

(21) Appl. No.: 11/603,565

(22) Filed: Nov. 22, 2006

(65) Prior Publication Data

US 2008/0120552 A1  May 22, 2008

(51) Int. Cl.
*H04J 14/02* (2006.01)
*H04B 10/00* (2006.01)

(52) U.S. Cl. .................................. 398/98; 398/164
(58) Field of Classification Search ............. 398/70–72, 398/98, 164

See application file for complete search history.

(56) References Cited

U.S. PATENT DOCUMENTS

| 5,461,693 | A |  | 10/1995 | Pimpinella |
|---|---|---|---|---|
| 5,867,484 | A |  | 2/1999 | Shaunfield |
| RE37,125 | E | * | 4/2001 | Carlson et al. ............. 398/141 |
| 6,920,113 | B1 |  | 7/2005 | Kovvali et al. |
| 2002/0129379 | A1 | * | 9/2002 | Levinson et al. ........... 725/129 |
| 2003/0076558 | A1 |  | 4/2003 | Raman et al. |
| 2003/0223409 | A1 |  | 12/2003 | Wiebe |
| 2004/0141747 | A1 | * | 7/2004 | Kenny et al. ................. 398/71 |

FOREIGN PATENT DOCUMENTS

| EP | 0 492 862 | 7/1992 |
|---|---|---|
| EP | 0 828 356 | 3/1999 |
| EP | 0 951 154 | 10/1999 |

* cited by examiner

*Primary Examiner*—Quan-Zhen Wang (57) ABSTRACT

Device and method for fiberoptic transmission for a plurality of different communication protocols. A single electronic card is adaptable to any of a plurality of communication protocol configurations designed by the user.

7 Claims, 8 Drawing Sheets

Step B – Name your locations.

Fig 6b

Step C – Select the most suitable housing unit, a factor which is deirectly linked to the environment in which your systems will be situated.

Fig. 6c

Step D – Now we select from various video, audio and data signals we wish to transport.

Fig. 6d

Step E – Select your optical fiber preference.

Fig 6e

Step F – Select your optical parameters/requirements (budget/distance).

Fig 6f

Step H – A specially tailored optical communication system has now been crreated, with precise model numbers allocated to the specified requirements.

Fig 6g

Final Configuration – System Diagram

Once the system has been designed, a project number number is allocated which, when imported into an internal production system automatically creates a build of materials, assembly drawings and procedures for building the precise system designed.

Fig 6h

DEVICE AND METHOD FOR PROVISION OF CUSTOMIZED SYSTEM FOR OPTICAL TRANSMISSION OF DATA

FIELD OF THE INVENTION

The disclosed device relates to the field of electronic devices for transmission of data over a network. More particularly it relates to an apparatus and method for configuring a multi purpose data communication system for communication of video, audio, and data signals, each with differing protocols, on a fiber optic network using a single optical wavelength to communicate any of the differing types of signals and protocols associated with it. Further, an interface is provided to allow users and purchasers, to configure the customized system and required software, using a plurality of menu driven graphical interface screens and common configurable components.

BACKGROUND OF THE INVENTION

With the ever widening reach of the public and private data networks used by the public and especially by business and government, there continues to be an increase in the flow of electronic data over such networks. Such communication may be from remotely located differing branches of government offices, or different divisions of a company. Further, such electronic communication may include video, audio, data, or other types of data signals, each with its own communication protocols that must be followed in the transmission and reception of intelligible communication signals.

Additionally, with this rise in electronic traffic worldwide, between remote locations, there is an ever increasing demand for a transmission system that can both transport and accommodate continuously increasing levels of bandwidth consisting of multiple channels of video, audio and data over long distances. The optimum solutions for this demand are systems which involve the least number of transmission mediums as possible and that are unaffected by environmental hazards from static, and electrical disturbances.

Fiber optics serve as the best solution to the problem of environmental interference. Transmission of electronic signals for data of all types over fiberoptic networks, will eliminate EMI radiation, EMI susceptibility and other factors which would otherwise affect copper or other cable. Consequently, this makes fiber the choice for high quality video transmission as well as conventional data transmission.

However, as noted there are a variety of video, audio and data signals, using protocols specific to the type of signal carried, that a multipurpose fiber optic transmission system must accommodate. For each of these signal types and its respective protocol, there is conventionally employed a generally unique transmission component to generate it.

Because each user at each transmission and reception site, may be employing any or all of the different electronic signals and protocols, it is a complex task to design and manufacture site-specific data transmission systems that will communicate with remote sites which in fact might have the same or other types of electronic data signals and associated protocols to accommodate. Such differing types of data stream transmission and reception requirements, even between two remote locations of the same company or government department, creates a logistics nightmare of sorts in designing a data transmission and reception system that will suit the customer's individualized needs.

Currently, such designs may entail computers with multiple types of data transmission cards or components engaged to local and wide area networks. Depending on the type of signal being communicated from one point to another over the network, any one of the differing transmission cards or components might be employed. Of course each of the differing components may also require software or drivers to allow it to communicate with the controller or computer with which it must send and receive the signal at using the proper communications protocol. Further complicating matters is the problem encountered when signals originate over an ethernet network and must be converted to transmission over a fiberoptic network for communication to the remote destination.

There is as such, a pressing need for a device, and method of configuration of the device, that provides a single system for communication of the various data signals that might originate in any highly customized client venue location, and allow for transmission of those signals to one or more remote locations using a fiberoptic network. Such a system should allow for any conventionally employed data protocol to be used by the originator and receiver of the signal, yet still allow the signal to be transmitted over a fiberoptic network.

Still further, in a particularly preferred mode of the invention, a configuration of the manufactured system should allow for customization by the buyer, of the produced device, according to the existing communications streams and protocols being currently used by the buyer. The buyer essentially should be able to design a customized component, to accommodate their current communications data streams and protocols, to communicate them to remote locations in a single device providing fiberoptic transmission. Such customization, heretofore being hard to achieve if at all, allows users to maintain the state of their network communications types and protocols, while still being able to take advantage of the benefit of fiberoptic network transmission. This eliminates any requirements for the users to upgrade and change all their systems and protocols before taking advantage of the benefit of fiberoptic network communication, thereby eliminating the costs and inevitable problems that such an upgrade would entail.

SUMMARY OF THE INVENTION

The above problems and others are overcome by the herein disclosed system and interface allowing users design of a device customized to their individual communication types and protocols. The resulting device combines the differing user required communication types and protocols into one system, which allows communication over a single optical wavelength, of the many divergent protocols and data requirements of differing users.

As such, those skilled in the art will appreciate that the conception, upon which this disclosure is based, may readily be utilized as a basis for designing of other methods and systems for carrying out the several purposes of the present invention. It is important, therefore, that the claims be regarded as including such equivalent construction insofar as they do not depart from the spirit and scope of the present invention.

An object of this invention is the provision of a fiber optic transmission system that will accommodate highly divergent types of electronic data stream transmissions and related protocols, in a fiber optic transmission.

Another object of this invention is the provision of such a system, which allows the user or buyer to configure the produced device for fiber optic transmission, to accommodate their individual on-site electronic transmission types and protocols, and allow all to be transmitted over a fiberoptic network.

An additional object of this invention is the provision of a system that provides this customization, by the employment of a base component having an engaging bus operating over a back plane that is adapted to engage a plurality of different engageable electronic processors for signals of differing types and protocols, and convert the differing signals to a fiber optic transmission.

A further object of this invention is the provision of such a customizable component, which allows the user to design the device using menu-driven software and network access, and the resulting fiber optic transmission device and software to be customized to those user requirements.

A still further object of this invention is the provision of such a customizable component, which has a basic processor and operating system onboard, which is adapted to allow inclusion of any of a plurality of processing chips for different data, and software, on the produced card.

Yet another object of this invention is the provision of such a fiber optic transmission device, with customized data protocol devices engageable to a bus operating with a common back plane, which are all daisy-chained to a fiber optic transmission component.

Utilizing advanced Time Division Multiplexing (TDM) Methods of operation, and a unique daisy chained series of component processing cards, engageable operatively in a bus connected through the back plane adapted for their communicative engagement, transmission of multiple channels and varieties of data transmission are achieved over a single fiberoptic cable thereby saving mediums for other sources. The system so configured accepts different video, audio and data electronic signals and protocols, for transport in any number of channels and combinations. Still further, in a particularly preferred mode of the device, the device maximizes used bandwidth through employment of Coarse Wave Division Multiplexing (CWDM) techniques in combination with its TDM capabilities. Using one or a combination of components and techniques, the resulting device, user-configured to their individual requirements, provides transmission of many channels and protocols over a minimal number of optical fiber strands.

The system consists of a smart combination of Multiple Clock Domains Division and Recovery technique that is implemented on an individual electrical card. Each modular card is adapted to transmit and receive different electronic formats of video, data or audio protocols, depending on user requirements. All cards configured to process one or a plurality of individual data streams and protocols are also configured to be modular, scalable and flexible.

The method of device configuration provides that each bus engageable electrical card communicating through the backplane of the device, serves as a base motherboard that is configurable, depending on installed components to that card, to any of a plurality of different resulting communications modules. Each communications module, formed of the appropriate components engaged in the base modular board, will transmit a specific format of video, data or audio using the appropriate protocol.

For example, if one channel of analog video is required by the user, the same base motherboard that would address more than one channel of the same video (or other protocols of audio or data) would be configured with components adapted to transmit the one channel. Therefore, each card is scalable in its function as a communications module. The cards, configured to the data and protocol requirements of the user, are engaged to a common bus and backplane which also engages with one of the cards being a master optical transmission card. Differing data in the differing protocols are received by the individual cards adapted to handle it, and thereupon communicated to the optical transmission card for transmission over fiberoptic lines of communication. A reverse process occurs at the receiving site where a substantially identical configuration of electronic cards is engaged with a bus to receive the fiberoptic transmission.

The resulting device is also designed in such a way to enable daisy chain capability between the individual configured cards engaged through the bus and common back plane to one of the cards configured as an optical transmission card. Each of the optical transmission cards, so engaged, is adapted to transmit several channels on a single laser and can also communicate with other customized cards within the daisy chain so that one optical port on one optical transmission card will transport the signals inserted from all cards in a daisy chain.

Each of the customized cards inserted into the bus, will communicate its data to a card configured as an optical transmission card, at the appointed time designated to its position in the chain of cards. The end card on the bus, using software adapted to the task, will ascertain its position as last in the chain of cards and communicate that terminating position so that the controlling card configured as an optical transmission card will be able to assign transmission times and durations to the different cards in the chain based on the number in the chain. There are no technical limitations to the number of customized cards that can constitute a single daisy chain between the optical transmission card and the last customized card in the chain. The number of cards that would transmit over a single fiber wavelength would be limited by the total bandwidth supporting the configured optical transmission card which is presently 2.5 GB.

When the system/laser bandwidth is maximized, fiber strands coming from other cards can be combined together using CWDM techniques. This is used in order to create a larger multi-channel solution over a single fiber. The entire system is managed by an SNMP Ethernet-based protocol.

In the particularly preferred mode of the method of a configuration of the device, each produced system can be individually configured by the user/designer on-line. This user customization to their individual communications type and related required protocols is heretofore unachievable for such a complicated system with so many components that must interface. However, using the system of base component cards customizable to any type of user required protocol, and an interface of proprietary software allows the configuration of a system tailored specifically to a client's needs, the device may be actually designed by the buyer or user online and then produced.

The menu driven on-line software will build the system to meet the communications protocols input by the user and output the data to the factory to support the actual production of systems ordered. Then, employing the component electronic cards that are customizable to a plurality of data format and protocol requirements, the components required are inserted into mating chip receivers. Next, software programming is imparted to the controller on the component card controller with pre configured software adapted to operate the inserted components on the card for the user's protocol requirements, and to communicate with any others in the chain of configured cards, and the optical transmission card. Finally, one or a plurality of the component cards, configured with both engaged components and compiled software adapted to handle the user data protocol requirements, are engaged with the bus and back plane in a slotted engagement in a receiver, along with one or more of the cards configured to also function as optical transmission cards.

In operation, once so configured, the cards in the daisy chain engaged to the bus will operate to identify themselves to adjacent cards upstream as an adjacent card in the chain, or the final card in the chain. The card configured to be an optical transmission card, will act as the master by ascertaining the number of downstream cards, the number of processing chips in each of three chip receivers in each card, and assigning time slots for their individual respective data communication to the optical transmission card for optical communication over a fiberoptic cable. The card configured as the optical transmission card controls the daughter cards and time periods for sending of data from each chip, in each card, by position of the card in adjacent slots, and the position of the processing chips on each respective card.

A mirrored set of optical and daughter cards is positioned at the opposite end of the fiberoptic cable for sending and receiving the various data, video, and optical protocols. Thus the card acting as the optical card and therefor the master on each system in receiving mode, will send and receive electronic signals, at specified times and durations, to the individual processing chip, on an individual card in a slot which is in the identical position as that of the transmitting system. Thus, which card, and which chip, at the receiving site, to which the common fiberoptic transmittable protocol signal is sent, is dependent on the common scheme of time and duration allotted to both sets of cards and chips on both fiberoptic transceiving units.

This unique component configuration adaptable to the user/buyer input for individual communications protocols, provides for a degree of customization for differing user data protocols heretofore unachievable. Further, the unique provision of daisy chaining of component cards and Time Division Multiplexing (TDM) by the controlling optical transmission card in the chain, maximizes the amount and type of data transmission achievable by a unit in the smallest amount of time over a single fiberoptic cable. Users thus become the designers of their own equipment which will allow the user to maintain their current and working system of communication protocols and adapt the device transmitting the data to their individual requirements rather than having to adapt their internal systems to the requirements of a conventional fiberoptic device using its own protocols and standards.

With respect to the above description then, it is to be realized that the optimum relationships for invention are to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction, mixtures, and operation shown and described, and accordingly, all suitable modifications and equivalents may be resorted to, falling within the scope of the invention.

BRIEF DESCRIPTION OF THE DRAWING FIGURES

These together with other objects and advantages, which will become subsequently apparent, reside in the details of the construction and operation as more fully hereinafter described and claimed, reference being had to the accompanying drawings forming a part thereof, wherein like numerals refer to like parts throughout.

DETAILED DESCRIPTION OF THE PREFERRED EMBODIMENTS

In this respect, before explaining at least one embodiment of the invention in detail it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Referring now to the drawings in FIGS. 1-6 some preferred embodiments and operational modes of the present invention and unique modular configuration providing for a method of a user configuration of fiberoptic data transmission system and production thereof based on the user or buyer input which configures the modular cards 12 on which the system is based.

Figure 1:
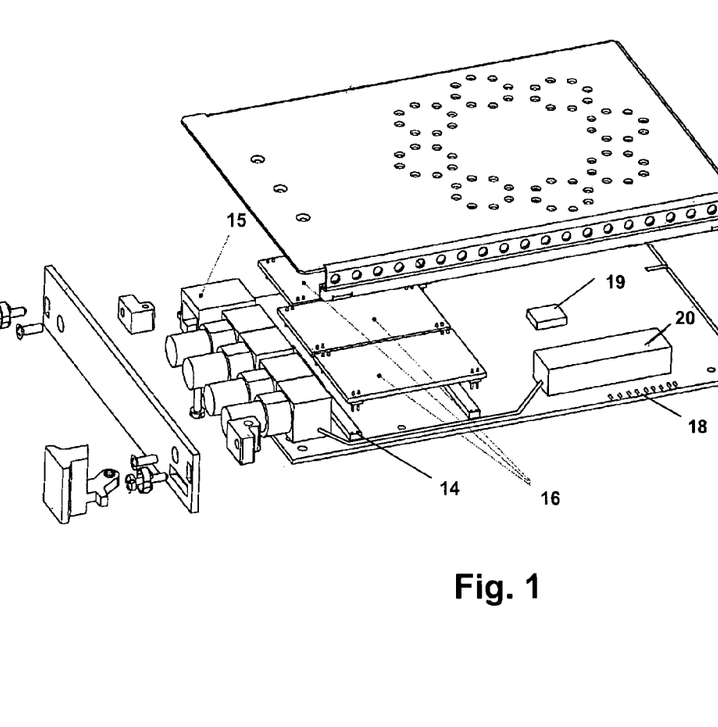
FIG. 1 depicts a perspective view of a configurable card adapted for population with any three of a plurality of different processing chips, to provide for user-chosen communications protocols and requirements.

As depicted in FIG. 1, a modular card 12 is provided that is adaptable for multiple configurations with populatable components and software routines, to drive the chosen components for each modular card 12. The modular card 12 is configured such that it will allow for engagement with a chip receiver 14 with a plurality of data processing chips 16 adapted in construction to transmit and receive different formats of video, data or audio electronic protocols. The ultimate configuration of each modular card 12 may be handled by the factory, or may be determined by user input in a menu driven ordering system employing a graphic interface available to the user over network communication. The user, choosing from a listing of communications proposals chooses one or a plurality of requirements for their individual data stream needs wherein one or a plurality of modular cards 12 is populated with appropriate components and software and optical communication components.

Each modular card 12 is adapted for operative electronic means for engagement with a bus and communicating backplane on a motherboard 26. Each modular card 12 is configurable as a combination multiprotocol communications card acting as an optical transmission card as in FIG. 3, or as multiprotocol communications modular card 12 which is controlled by an optical transmission card 13. The modular card 12 and optical transmission cards 13 are also adapted with individual mechanical interfaces adapted to the individual communications protocol connections of the wires carrying it.

Figures 2, 3:
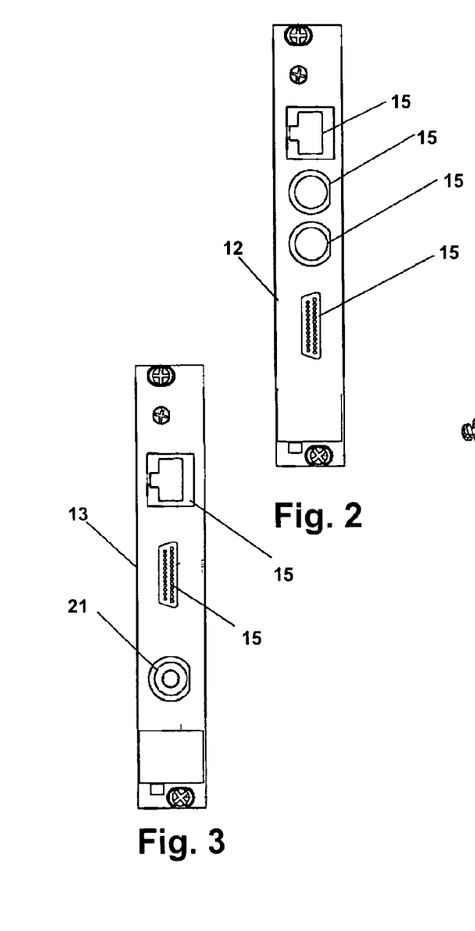
FIG. 2 depicts an end view of a mounted card of FIG. 1 as engaged with a bus, showing mating connections for different types of communications terminating connectors for wire and fiberoptic cables.
FIG. 3 shows the common card of FIG. 1 outfitted to also function as the optical transmission card adapted for fiberoptic transmission over an engaged cable.

Operative electronic engagement to the bus and motherboard 26 as shown is provided by electrical contacts 18 for a frictional electronic engagement of the modular cards 12 into sockets or slots engaged to a bus in communication with the motherboard 26 and its backplane in a conventional fashion. However, other means as would be employed by those skilled in the art are anticipated.

The modular card 12 whether configured as a modular card 12 or optical transmission card 13, when so engaged with the bus, communicates through the bus and backplane of the motherboard 26 with the other cards in the other slots. All modular and optical transmission cards are operatively engaged to a power supply powering both the motherboard 26 and all modular cards 12 and optical transmission cards 13 so engaged.

In a conventional fashion, the motherboard 26 and cards 12 and 13, are engaged in a housing thereby forming a processing unit 11. The modular cards 12 and optical transmission cards 13 are also populated with cable connectors 15 adapted to the data stream protocols and types of cable indicated by the user for input and/or output of the individual data streams chosen and which are supported by the populated chips 16 and compiled software stored in memory 19 on the card 12 to drive the chosen chips 16.

As noted, each modular card 12 is adapted for a user-designated configuration, by populating the card 12 with one to three chips 16, adapted to handle the selected data steam types and protocol and communicate to an optical card for fiberoptic transmission. Chips 16 chosen to accommodate the chosen data streams and protocols are populated to the cards 12 in one of three possible positions on each of the cards 12, and concurrently software drivers for the chosen chips 16 are compiled into ROM memory on the card 12 to operate the chosen chips 16, in their designated positions on the card 12, for the chosen protocols.

Consequently, each modular card 12 can be configured to an optical card 13 with one or a plurality of chips 16 which serves as the master, or as a daughter modular card 12 with one or a plurality of chips 16 in individual designated positions on each card 12. The daughter or modular cards 12 provide fiber optic transmission capability of multiple individual protocols by communicating with the master optical card 13, in a fiberoptic transmittable protocol derived from up to three communications protocols from a group of protocols including video, audio, and data protocols. By employing one modular card 12, with up to three protocols engageable to a common bus and controlled by a modular card 12 configured to be an optical card 13 also having up to three protocols provided by engaged chips 16 thereon, user customization of the configured system is maximized and manufacturing costs are minimized and great time savings are achieved. Further, using the unique mode of operation, noted herein, system operation is simplified for the user.

Each populated modular card 12, formed of the appropriate chips 16, in individual positions in receivers 14, for the user chosen local communications protocols, is also populated with compiled software code to interface and operate the chips 16 in their respective positions. The populated modular card 12 is then engaged to the base motherboard, and will thereafter transmit and receive any of the chosen specific data stream formats of video, data or audio, over a fiberoptic cable 17 using the adjacently modular card 12 which is configured to operate as the master optical card 13. Communication between all chips 16 on all cards 12 and 13 is in a common fiberoptic transmittable protocol. This common protocol is adapted for the most reliable communication over the fiberoptic cable, however, it could be in other mediums in addition to a common fiberoptic protocol such as an IP/Ethernet protocol.

The optical card 13 is adapted from a modular card 12 to transmit with the common fiberoptic protocol, using an optical transceiver in the form of fiberoptic laser 20 and receiver engaged to the modular card 12 in the receiver 14 adapted for operative engagement. Software to drive the laser 20 and receiver to transmit and receive in the common fiberoptic protocol, is also populated to memory on the optical card 13 as is software making it the master card for any associated modular cards 12. Optical communication to one or a plurality of fiberoptic transmitting and/or receiving systems, with similarly configured modular cards 12, is provided by fiberoptic connector 21 engaged to a fiberoptic cable 17.

As noted, the plurality of populated component cards 12 each adapted with software to drive one or a plurality of specifically located chips 16 for the chosen protocols for conversion from or to the common fiberoptic transmission protocol, are engaged in the bus and will communicate in a daisy chain between the individual configured cards 12 engaged through the bus and common back plane, and with the card configured to be the optical transmission card 13. Each of the optical transmission cards 13 is also adapted to transmit and receive several channels in the common fiber optic transmittable protocol, on a single laser 20 and communicates with all other customized cards 12 within the daisy chain. This engagement thereby allows one that one optical transmission card 13 to optically communicate the divergent signal protocols, in the common optical transmittable protocol, which is receive from, or communicated to, the individual chips 16 on all the adjacent cards 12 which are engaged to the bus and communicate in a daisy chain.

Figure 4:
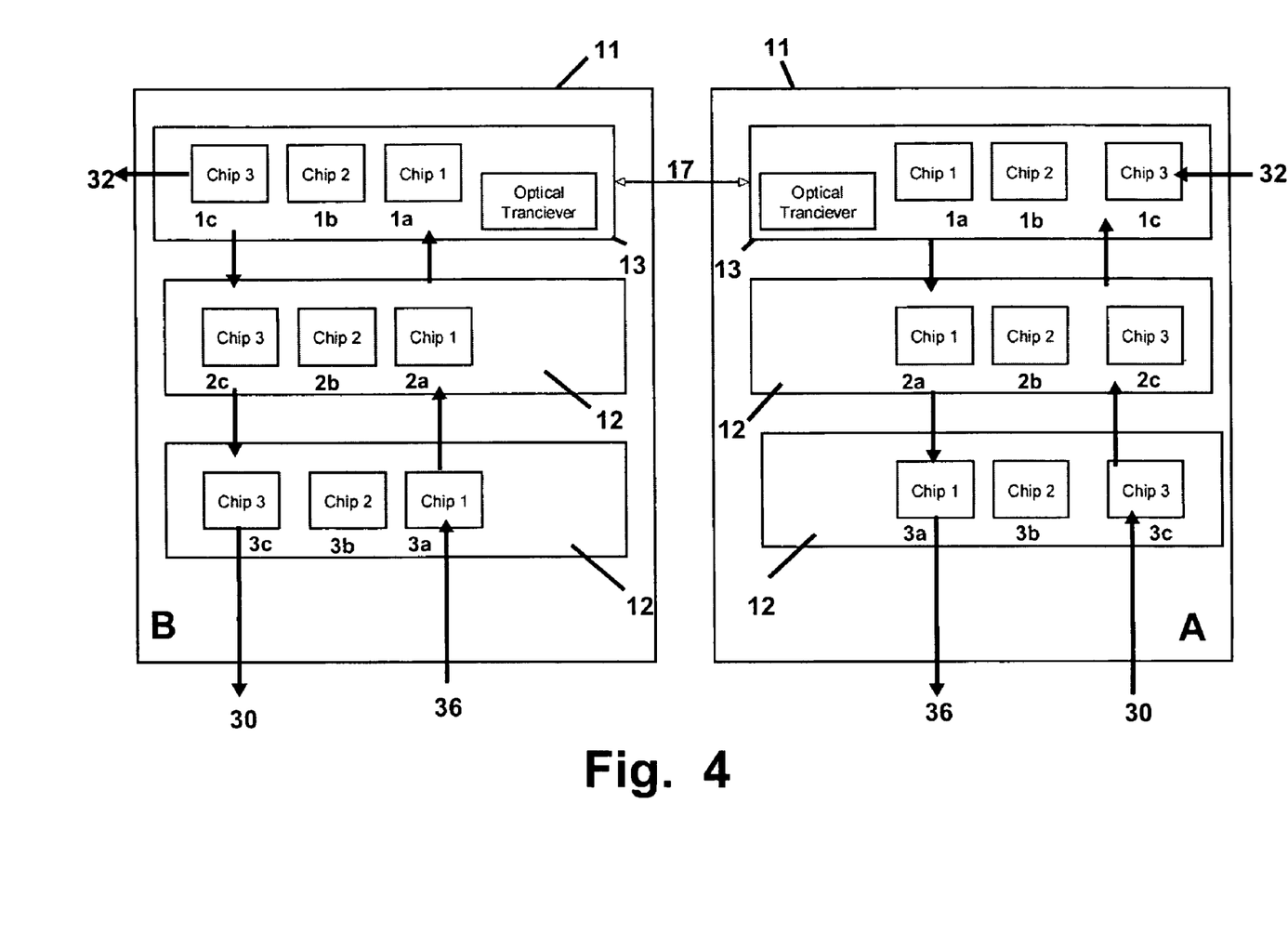
FIG. 4 is a graphic depiction of a flow chart of a preferred embodiment of the invention depicting two processing units with three cards engaged and the flow of communication there between starting and ending in different protocols.
Figure 5:
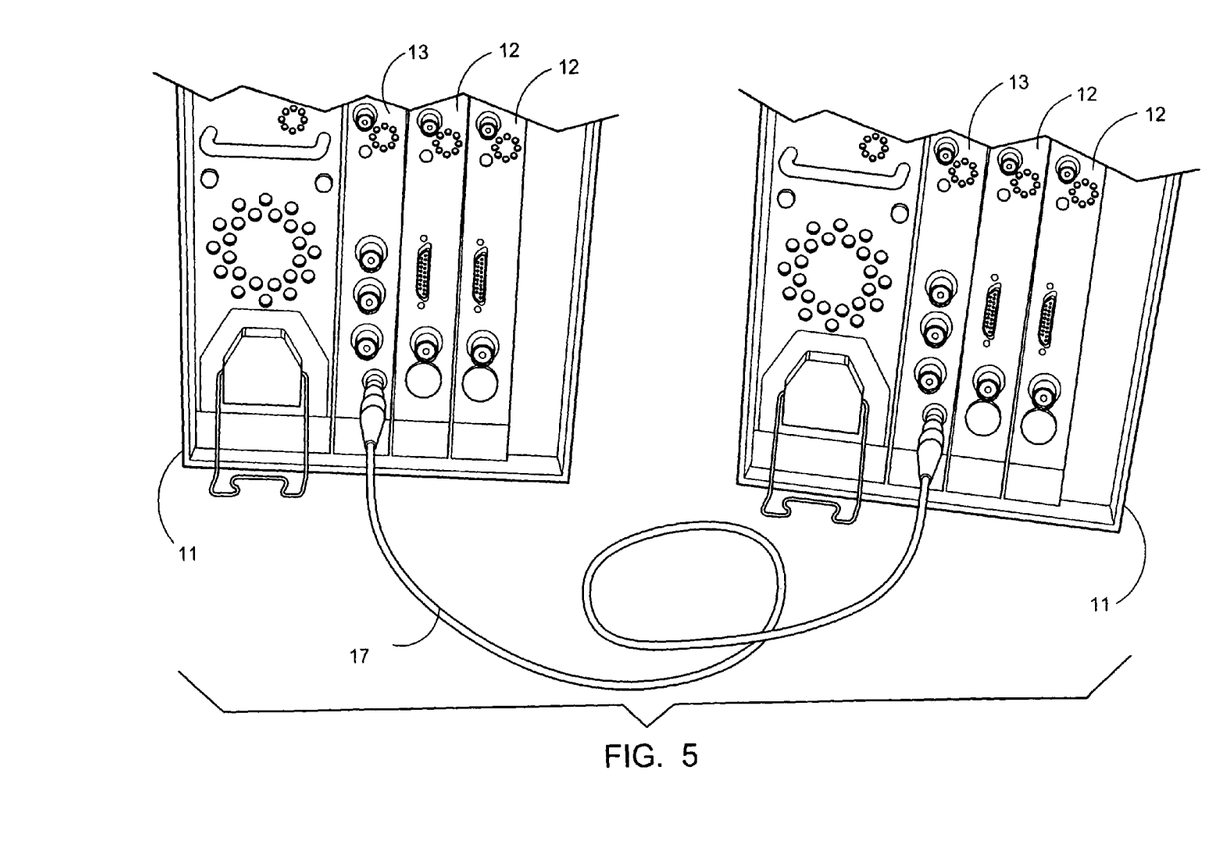
FIG. 5 depicts two fiberoptic engaged processing units with a plurality of cards communicating over a fiberoptic link.
Figure 6A:
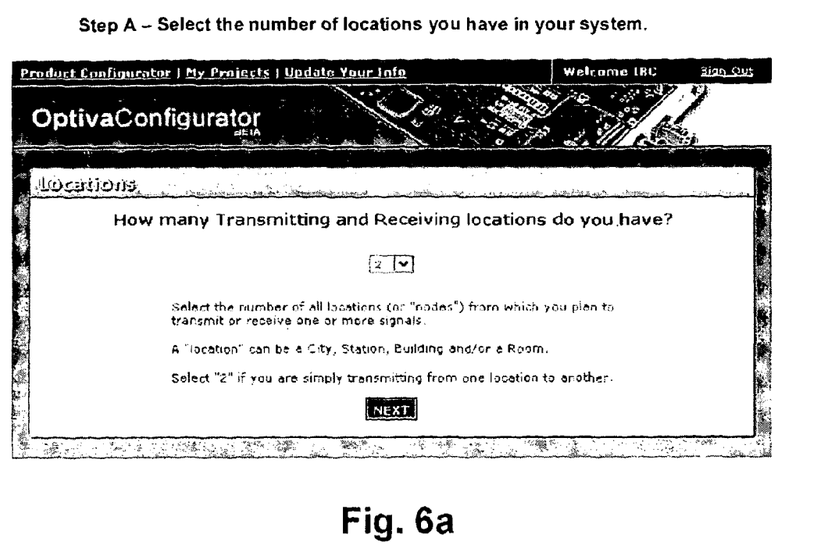
FIGS. 6a-h depict the graphic interface and steps providing for user configuration using a menu driven interface accessible over a network wherein the employment of the common cards of FIG. 1 allow a fiber optic transmission system to be designed by a user and manufactured using the common configurable electronic cards populated with appropriate processors and software snippets.
Figure 6B:
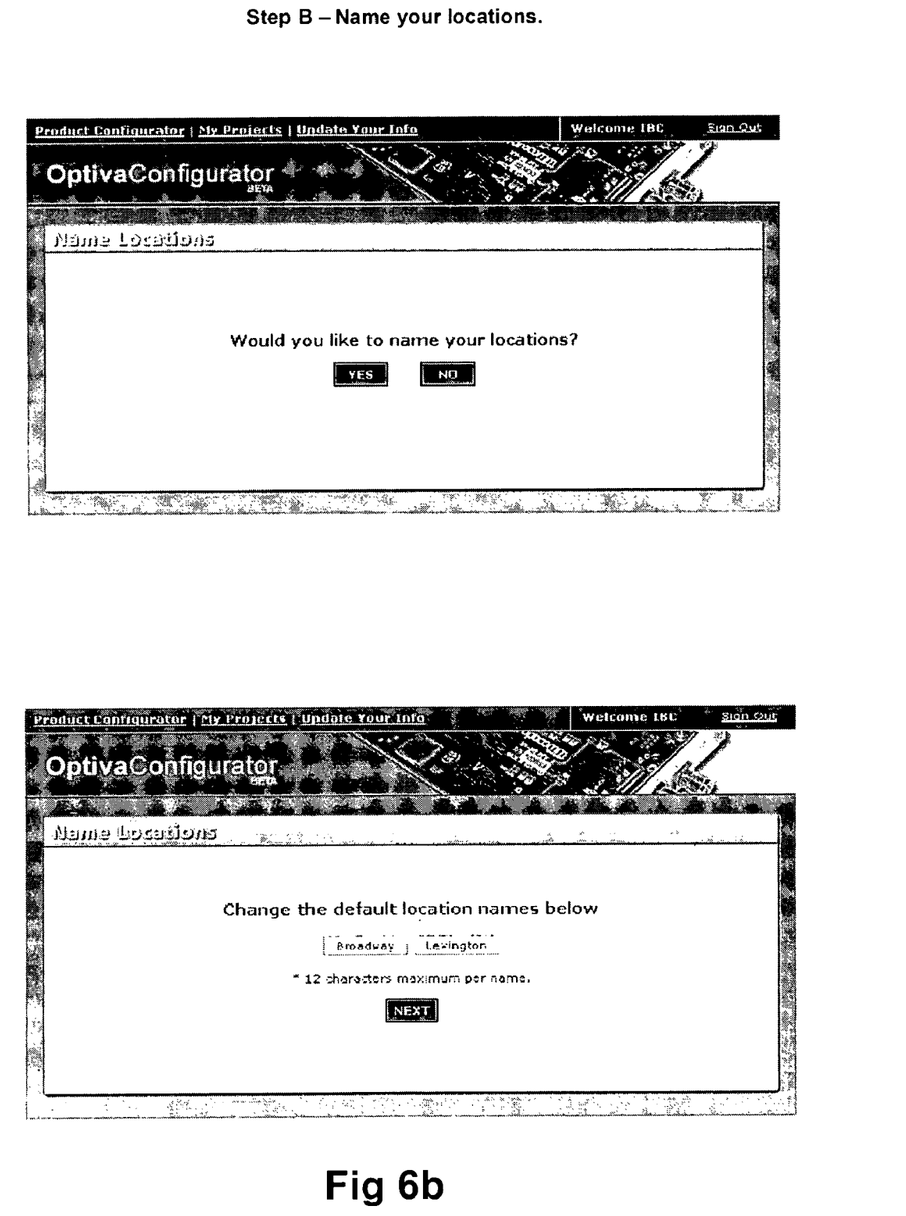
Figure 6C:
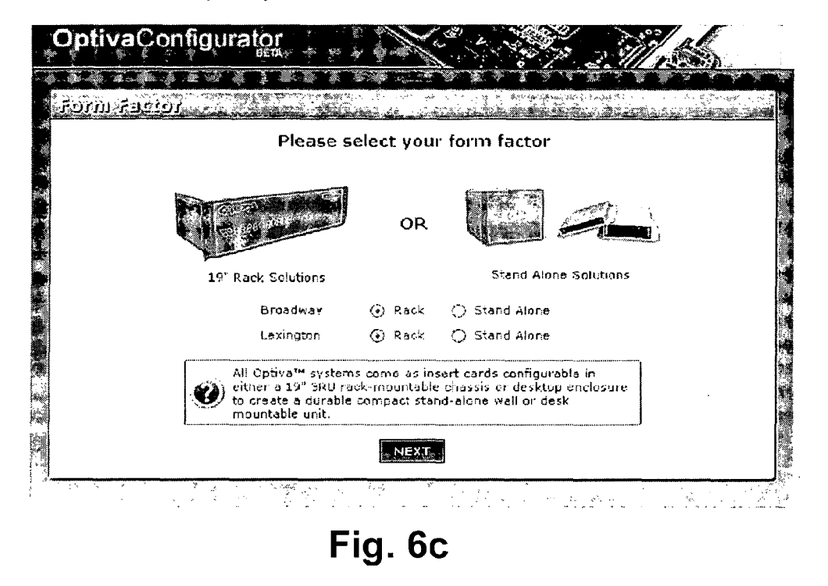
Figure 6D:
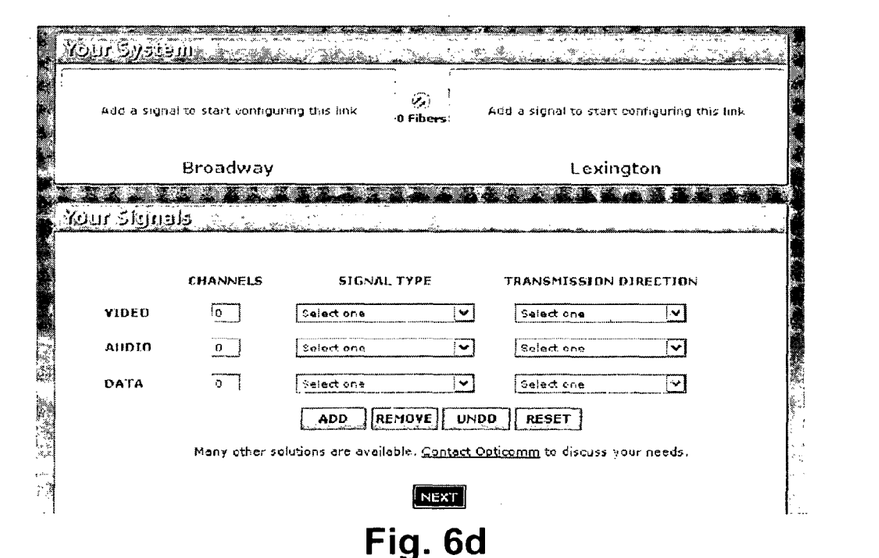
Figure 6E:
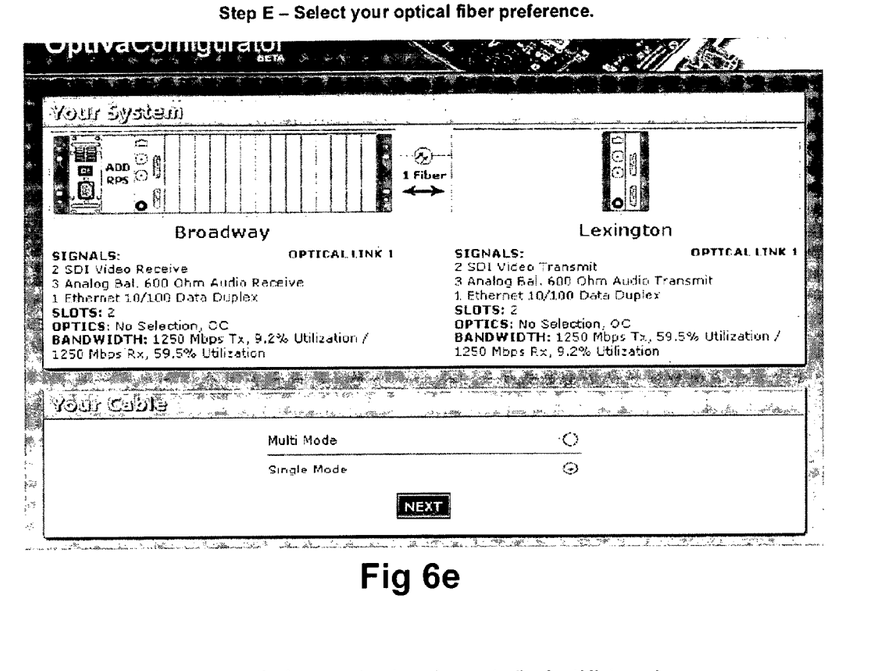
Figure 6F:
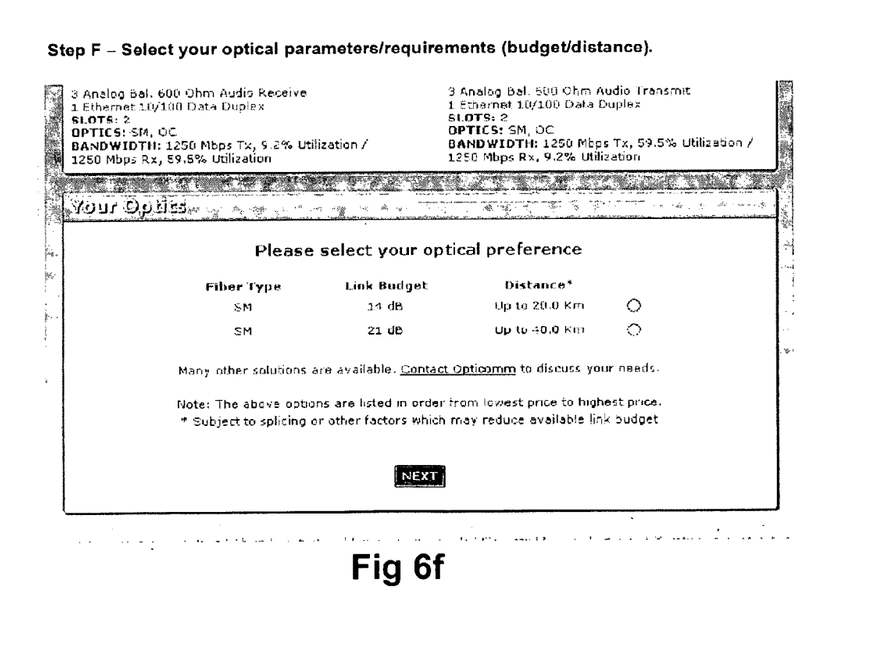
Figure 6G:
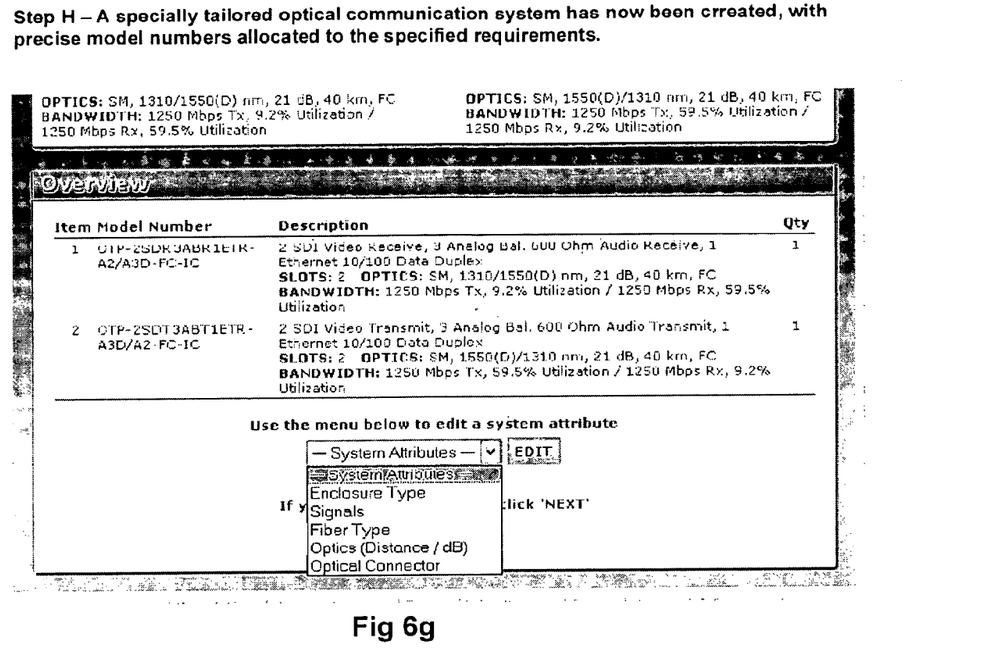
Figure 6H:
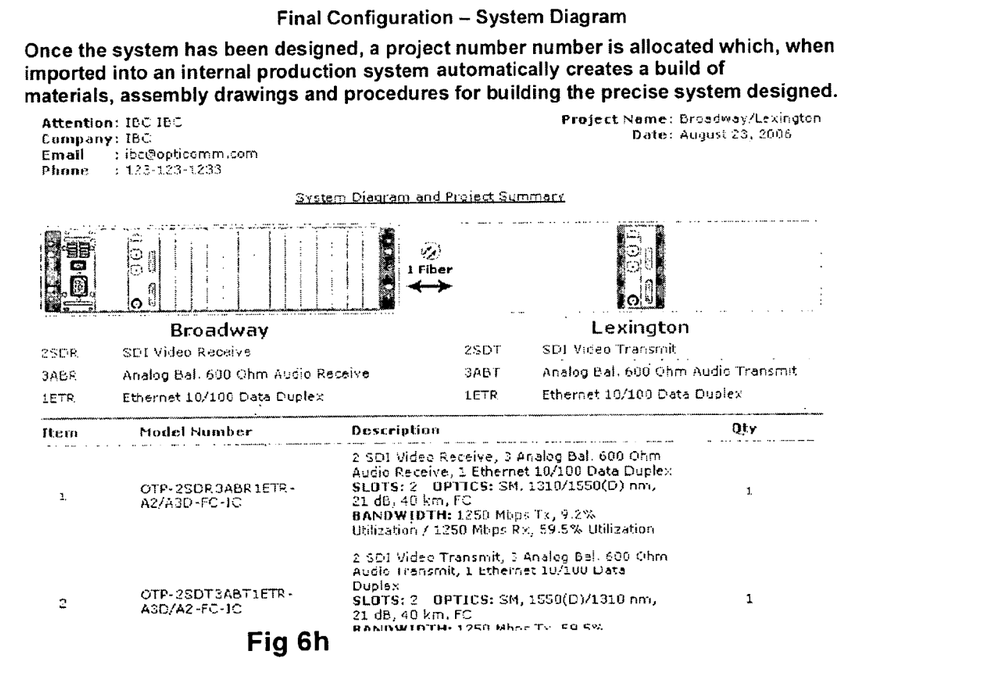

In operations each customized modular card 12 communicating over the bus, will communicate in the common fiber optic transmittable protocol, with the optical transmission card 13, at times and durations designated to the respective chip 16, in its individual position on its respective modular card 12. As best seen in FIG. 4, each card has a specific position and each chip 16 a specific positions on each card 12 and 13. The time and duration during each cycle, for each chip 16 in each position on each card 12 in its respective slot, is determined by the software populated to the optical transmission card 13 which functions as the master. Firmware on each modular card 12 and the optical transmission card 13, ascertains its respective slot position in the daisy chain from first to last, and the respective chip 16 position on the card in the slot, and communicates that information to the optical transmission card 13 which uses that slot position information, and individual chip 16 position information, on each respective card 12, to ascertain and assign time and duration assignments for communication to or from, each individual chip 16 on each modular card 12 in its respective slot on the motherboard. The cards 12 and 13 operatively engaged to the motherboard 26 are also positioned in a selected housing 27 to form a fiberoptic transceiving unit. As noted, at least two such units, of mirrored card and chip configuration, are connected for transmission of the common fiberoptic signal between the two locations. A plurality of similarly configured fiberoptic transceiving units can also be employed to send and receive between multiple locations concurrently. The firmware or compiled software on each card 12 and 13, during any communication during the assigned time of a cycle, sends the slot identification number and chip position information in its communication from one card to the next in the daisy chain communication. When sent over the fiberoptic link between the optical transmission cards 13, the slot and chip location information is employed to deliver the databurst to a chip 16 in the same slot, on the receiving processing unit 11.

The modular cards 12 in the daisy chain are customizable for multi-oriented video, audio, and data streams in their respective protocol, all on the same card 12. Video signals supported on a card 12 in combination with audio and data include: Composite Video, SDI, HD-SDI, DVD-ASI, S-Video, VGA, DVI, and HDMI. Audio signals for which the modular cards 12 are configurable along with Video and Data signals, include Analog Audio, Studio Quality Audio, Digital AES/EBU audio, and others. Data signals supported in combination with the audio and video include RS-232, RS-422, RS-485, Dry Contact, 10/100 Ethernet, and Gigabit Ethernet. Of course those skilled in the art will realize that other protocols can be accommodated now or as they develop by positioning the appropriate chip 16 and populating the appropriate drivers to a card 12 or 13 to drive it during the time duration assigned that chip 16 in its card slot, and all such protocols are anticipated in the scope of this patent. Further, while the common protocol communicated to and between the optical transmission cards 13 could be an IP/ethernet protocol if such is desirable.

In the particularly preferred mode of the method of a configuration of the device 10, each system of two or more fiberoptic transceiving processing units 11, shown in FIGS. 6*a-d*, is configurable by the user using an online interface as shown. The ability to allow the user to configure the system is provided by the employment of individual cards 12 that may be configured into the systems 11.

In a first step, the user would be allowed to log onto a server and be provided a graphic interface of steps to a final configuration. The user is first questioned about the number of locations between which communication must be enabled to determine the number of processing units 11 required for their system. Next, they are asked to name the locations or accept default names. In a next step, drawing on user knowledge of the locations, a form factor from the casing housing the processing units 11 is chosen by the user. Next, a menu of different types of data streams or protocols from which to choose is presented along with a transmission direction for each. The choices are provided by drop down menus in the graphic interface, from a library or lookup table of stored data streams supported by chips 16 and software that may be immediately populated to the modular cards 12 and which provide the user with choices for their desired data stream protocols and directional requirements, from a plurality of video, audio, and data protocols. Next, the user is questioned as to their optical fiber preference since they will know the type of fiber communicating between the earlier named locations. In a next step, the user is questioned as to the distance requirements for the link between the named locations so that appropriate fiber optical transmitters are chosen for population to the cards 12. Finally, the user is queried about the connector type that will be required on the distal ends of the optical fiber 17 running between both locations.

Based on the user choices for data streams, direction of communication, and data and/or signal protocols and by employing the modular cards 12, and the engageable chips 16 and snippets of software for each card 12 to operate the chips 16 in their individual positions on each card 12, one or a plurality of individual modular cards 12 are populated with the appropriate chips 16 and populated with the appropriate software to drive the populated chips 16 on that modular card 12. Further populated are the appropriate connectors for the cables communicating to the cards at both locations. If three or less protocols are to be accommodated, one card 12 outfitted with the appropriate chips 16 and software and a laser 20 transmitter and optical receiver is populated accordingly for each system 11. If more than three protocols are required, additional cards 12 are populated accordingly with appropriate chips 16 and software.

From a selection of engageable connectors 15 adapted for engagement to the selected cable connectors chosen by the user in the ordering process, appropriate connectors 15 are populated to the modular cards 12 for the user sites. Once the sufficient number of modular cards 12 are populated and compiled with operating software for the chips 16 that accommodate the chosen protocols, all of the modular cards 12 including the one configured as the optical transmission card 13, are engaged to the bus and backplane of the motherboard in a slotted engagement in one of a plurality of slotted receivers for the cards 12 and 13 in the motherboards 26. The motherboard 26 and operatively engaged cards 12 and 13 are then operatively engaged in the housing appropriate to the chosen form factor and thus become the two processing units 11. The card or cards are then engaged in a motherboard 26 and the two are engaged in the chosen housings to accommodate the chosen form factors. The two units for the system are then shipped to the user for an easy installation.

Because of the unique system of operation noted herein using mirrored positions for the chips 16 and respective cards 12 which accommodate the chosen protocols and directions of communication, and with the cards 12 being adapted to handle any of the chosen chips 16 for those protocols, the system is easily configured, and works virtually out of the box and takes minimal support.

During operation thereafter, the optical transmission card 13 queries the other cards 12 daisy chained on the bus and ascertains if chips 16 are present in each of the receivers on each card 12, and, which slot the card 12 or 13, occupies on the motherboard.

The optical card 13 thereafter employs populated software for the task to determine times and durations for communication with each chip 16, in each position, on each card 12 and 13, and assigns times and durations for transmissions to and from the optical transmission card 13. At each location where a fiberoptic transceiving unit is located, the cards 12 will be identically situated in the same slots, with the same chips 16 for the chosen protocols occupying the same positions on each respective card 12 and 13. During each clock cycle on each device, communication to or from each respective chip 16 is handled at the same time and duration during the cycle. In this fashion, a signal communicated through a chip 16 at a location on a card 12 at a transmitting location, is communicated in the common protocol to the optical transmission card 13 and then over the fiberoptic cable 17 to a fiber optic transmission card 13 on a remote device. Thereafter the fiberoptic transmission card 13 on the remote device communicates to a receiving chip 16 in the same location on a card 12 as at the originating site, at the same time in the clock cycle, wherein it is converted back to the locally required protocol, from the common fiberoptic transmittable protocol.

Optionally, software or hardware such as dip switches may be configured to reassign chip 16 positions at any receiving location wherein the time slot and duration for a given cycle is detoured to a different chip 16 in a different position or on a different card 12. However for ease of operation, mirroring the cards and chip positions at the transmitting and receiving sites, provides a simple to configure and maintain system of communication for the user and is currently preferred.

As an example of operation in FIG. 4, there is graphically shown the two way communication between two fiberoptic transmission units located at two sites and communicating over a fiberoptic cable 17. Three communications are shown using input communication streams in three different protocols.

First shown is the input of a datastream in a video protocol 30 to the third chip 3c on the third card 12 of a first transmission unit "A". The incoming datastream is converted by the third chip 3c to a common fiberoptic transmittable protocol and at the assigned time in the clock cycle communicated in a daisy chain to the second card 12 and then to the optical transmission card 13. Over the fiberoptic cable 17 the datastream is communicated to the receiving or second transmission unit "B" and communicated to the same chip 3c on the third card 12 in that unit. Output 30 to the local system is through the appropriate connector over the appropriate cable.

A second transmission from an originating audio protocol is shown as audio being input 32 to the third chip 1c on the first card which in this case is the optical transmission card 13. At the appropriate time in the clock cycle, the chip 1c communicates through the optical transceiver 20 the audio datastream which has been converted to the common fiberoptic transmittable format which is communicated from unit "A" to unit "B" over the fiberoptic cable 17. On receipt at "B" the datastream, at the appropriate time in the clock cycle, is communicated by the optical transmission card 13, the third chip 1c on the card 13 which in turn reformats the datastream back to the appropriate audio protocol which is output 32 for local use.

A third transmission scheme using a third protocol is shown as an ethernet protocol input on unit "B" at 36 to the first chip 3a on the third card 12 in unit "B." The chip 3a and appropriate onboard software driving it converts the datastream from the ethernet protocol and into the common fiberoptic transmittable protocol whereafter it is transmitted to the optical transmission card 13 at the appropriate time in the clock cycle. The optical transmission card communicates the converted datastream to unit "A" and the optical transmission card 13 on that unit communicates the datastream to the chip 3a which is in the same position on the same card as the originating signal. The datastream is thereafter converted from the common protocol back to an ethernet protocol output 36 on unit "A" and communicated to the local network. As such, it is shown that any number of protocols in any direction may be communicated between two units easily.

As another example of the ease of use and ease of change of the system, if the user determines new types or more data streams in new or existing protocols require fiberoptic communication, the user may configure more modular cards 12 with chips 16 and software for up to three more protocols engageable to each card 12, which may be added to the bus. Once the new card 12 is engaged, the controlling optical card 13 will re-allot communication times and durations for each cycle to each respective chip 16, with the added card 12 as part of the equation. The receiving site would undergo the same change in timing and durations for respective chip locations and communication would be enabled for the larger protocol scheme.

The device and method for provision of optical transmission of a plurality of data streams in a plurality of protocols using modular cards allowing for a user configuration shown in the drawings and described in detail herein, disclose steps in a process, arrangements of elements of particular construction, and configuration for illustrating preferred embodiments of structure and method of operation of the present invention. It is to be understood, however, that elements of different construction and configuration and different steps and process procedures and other arrangements thereof, other than those illustrated and described, may be employed in providing a user designable optical transmission system accommodating a plurality of data streams and protocols with the spirit of this invention.

As such, while the present invention has been described herein with reference to particular embodiments thereof, a latitude of modifications, various changes and substitutions are intended in the foregoing disclosure, and it will be appreciated that in some instance some features of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

What is claimed is:

1. A fiberoptic communications apparatus for communication of a plurality of data communications protocols over a single fiberoptic link between at least two locations, comprising:
    a motherboard card having a processor and a memory; and
    a plurality of modular cards coupled to the motherboard card and capable of communicating with each other via a daisy chain configuration, each of the modular cards configurable as an optical communication card including an optical transceiver and couplable to the single fiberoptic link, or as a data communication card supporting one or more data communication protocols, via user downloadable firmware, wherein
    one of the plurality of modular cards is configured as the optical communication card and the remaining of the plurality of modular cards are configured as data communication cards, wherein
    each of the data communication cards is configured to communicate its respective configuration and position in the daisy chain to the optical communication card, and wherein
    the optical communication card is configured to control the data communication cards and assign time and data transmission duration for each of the data communication cards based on the respective configuration and position of each data communication cards, and transmit data received from a respective data communication card over the single fiberoptic link based on the respective assigned time and data transmission duration.

2. The fiberoptic communications apparatus of claim 1, wherein said data communication protocols is one or more of a group consisting of video, audio, and data protocols including, Composite Video, SDI, HD-SDI, DVD-ASI, S-Video, VGA, DVI, and HDMI, Analog Audio, Studio Quality Audio, Digital AES/EBU audio, RS-232, RS-422, RS-485, Dry Contact, 10/100 Ethernet, and Gigabit Ethernet.

3. The fiberoptic communications apparatus of claim 1, wherein said position of each data communication cards is utilized by a receiver to deliver the transmitted data to a corresponding receiving modular card.

4. The fiberoptic communications apparatus of claim 3, wherein said corresponding receiving modular card corresponds to a receiving card in a same position order as a respective modular card that had initiated transmission of said transmitted data.

5. The fiberoptic communications apparatus of claim 1, further comprising a plurality of processing chips pluggable in one or more of the plurality of modular cards, each of the plurality of processing chips configurable via said user downloadable firmware.

6. A method for configuring a fiber communication apparatus comprising a plurality of modular cards comprising the steps of:
   providing a network accessible user interface to a user;
   providing a first graphic input screen requesting input from said user about the number of locations between which a communication to be enabled to determine a number of processing units on each modular card required for a desired system;
   providing a second graphic input screen for user selection of a form factor for said processing units;
   providing a third graphic input screen allowing said user to choose one or more of data communication protocols, from a plurality of video, audio, and data protocols required between said locations;
   allowing said user to input a direction of transmission of each of said individual communications protocols;
   obtaining user input as to connector types for cables carrying each said chosen data communications protocols;
   based on the user choices for said individual communications protocols, and said direction of transmission, populating said data communication cards, with said data processing chips adapted to communicate in a common protocol between processing units and said data communications protocols locally;
   populating a memory on each said modular cards with software to drive said processing chips;
   based on said user input as to connector types, populating each said modular cards with appropriate connectors to operatively engage local cables to said cards; and
   engaging each said modular card with a respective receiver engaging a bus and backplane of a motherboard in each of said respective processing units;
   wherein said user can thereafter engage said processing units locally with cables having mating connectors to engage said connectors populated to said boards, and with a fiber optic cable communicating therebetween and thereafter communicate in a fiberoptic transmission between at least two locations over a single said fiberoptic cable transmitting any of said individual communications protocols chosen by said user.

7. The method of claim 6 additionally comprising the steps of:
   populating software to said processing units to control routing of communications between said two processing units by routing any outgoing transmission from a respective processing chip to a corresponding chip on said receiver in a mirrored position on said receiver, wherein the position of the originating processing chip for said outgoing transmission controls a destination chip on said receiver for said outgoing transmission.

* * * * *